Jan. 13, 1925.　　　　　　　　　　　　　　1,522,742
E. G. PARVIN
ADJUSTABLE SPEED ALTERNATING CURRENT MOTOR
Filed Jan. 26, 1921　　2 Sheets-Sheet 1
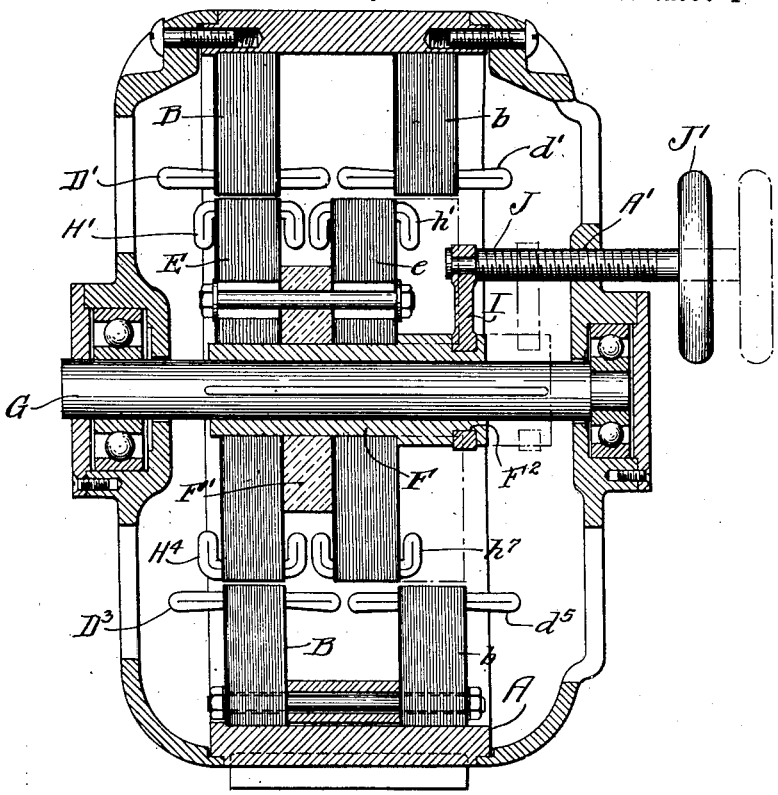
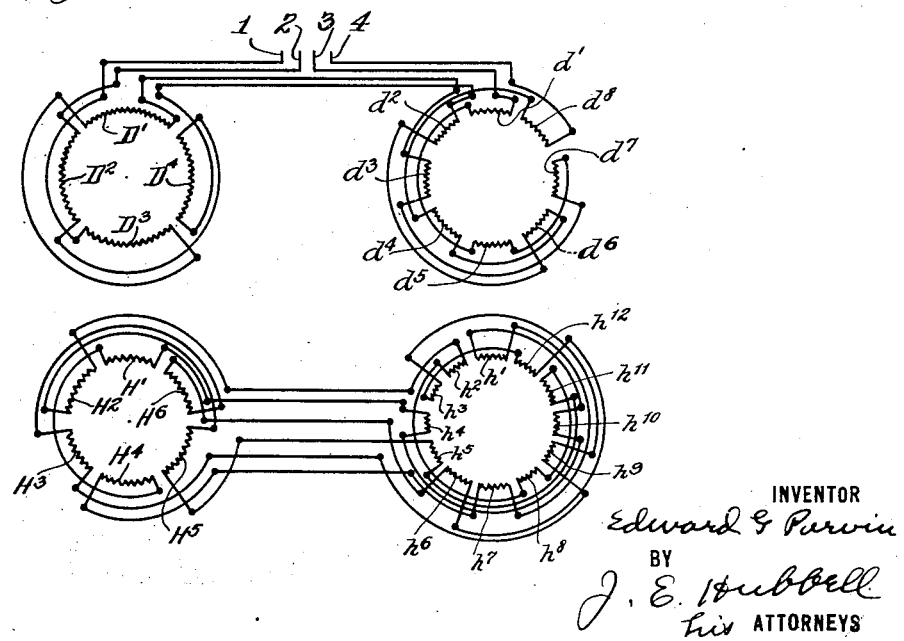
INVENTOR
Edward G. Parvin
BY
J. E. Hubbell
His ATTORNEYS Jan. 13, 1925. 1,522,742
E. G. PARVIN
ADJUSTABLE SPEED ALTERNATING CURRENT MOTOR
Filed Jan. 26, 1921  2 Sheets-Sheet 2
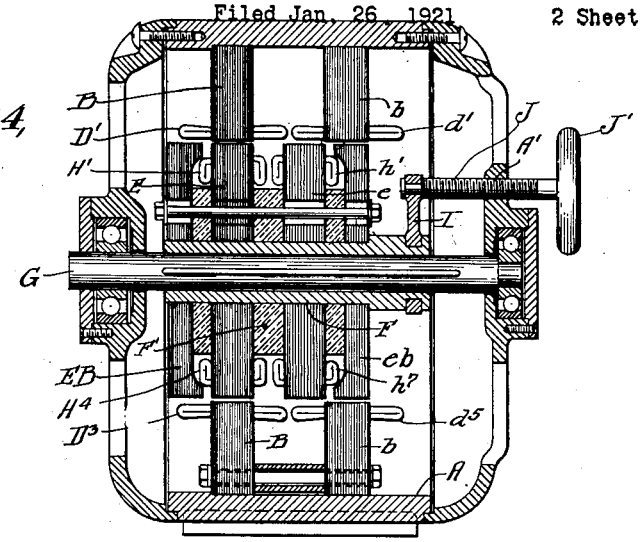
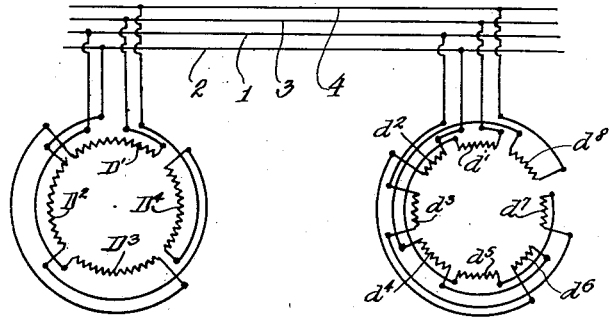
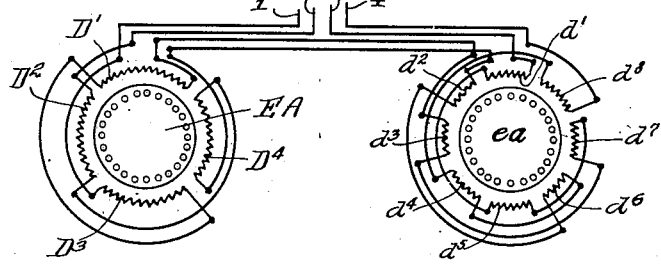
INVENTOR
Edward G Parvin
BY
J. E. Hubbell
his ATTORNEYS Patented Jan. 13, 1925.

1,522,742

UNITED STATES PATENT OFFICE.

EDWARD G. PARVIN, OF ROSELLE, NEW JERSEY, ASSIGNOR TO ZOBELL ELECTRIC MOTOR CORPORATION, OF GARWOOD, NEW JERSEY, A CORPORATION OF NEW YORK.

ADJUSTABLE SPEED-ALTERNATING-CURRENT MOTOR.

Application filed January 26, 1921. Serial No. 439,921.

*To all whom it may concern:*

Be it known that I, EDWARD G. PARVIN, citizen of the United States, and resident of Roselle, in the county of Union and State of New Jersey, have invented certain new and useful Improvements in Adjustable Speed-Alternating-Current Motors, of which the following is a specification.

The general object of my present invention is to provide a simple and effective adjustable speed alternating current motor of the induction type. In carrying out my invention I employ a primary motor member having provisions for generating two or more magnetic fields rotating at different angular velocities about the motor axis, and make provisions for adjusting the primary and secondary motor members axially with respect to one another, and so relatively arrange the primary and secondary members of the motor, that by such axial adjustment the inductive relation between the windings of the secondary member and the rotating fields induced by the primary is varied in such manner that the speed of the rotor of the motor tends to be that of one or another of the rotative speeds of the magnetic fields (less the necessary slip) or a mean of the speeds of rotation of different magnetic fields depending on the axial adjustment.

The primary member of the motor may be wholly a part of the rotor or wholly a part of the stator, or the means for generating one of the primary magnetic fields may be carried by the rotor and the means for generating the other rotary field or fields may be carried by the stator; but in the practical carrying out of my invention the primary member of the motor ordinarily is a part of the stator, and the secondary is carried by the rotor. The primary member must, in general, comprise at least two separate magnetic cores with the necessary windings for generating the two magnetic fields, and in practice I ordinarily provide at least as many secondary core parts as there are primary core parts and axially displace both the primary and secondary core parts, but the axial spacing apart of the primary element is different from the axial spacing apart of the secondary elements so that when the rotor elements are axially adjusted with respect to the stator elements into the position in which some one rotor element is in position for maximum magnetic interaction with a corresponding stator element, the magnetic interaction between each other element and the corresponding stator elements is at less than its maximum value. The secondary member of the motor may be provided with a simple squirrel cage winding or windings or with distributed windings of various forms. Where the secondary comprises a plurality of separately wound core parts the windings on the different core parts may be separate from one another or in some cases the winding of the secondary elements may be interconnected.

With whatever form of windings may be employed, however, the windings on the different elements should be so relatively arranged that each rotor element when in its position of maximum interaction with a corresponding stator element will tend to rotate at a speed which is different from the speed at which another rotor element tends to rotate when the latter is in position of maximum interaction with the corresponding stator.

For example, in a simple form of my improved motor comprising two rotors and two stators, the latter being provided with windings energized from the same multiphase current supply source, the stator windings are arranged to make the poles of one stator different in number from the poles of the other stator so that the revolving magnetic fields induced by the two stator elements will revolve at different velocities. With this form of my motor the rotor elements will tend to revolve at the same speed (less the necessary slip), as the field of one stator element when the latter is in the position of maximum interaction with the corresponding rotor element and when the rotor elements are axially adjusted to bring the other rotor into its position of maximum interaction with the other stator, the rotors will tend to rotate at the speed of rotation (less the necessary slip) of the field of the last mentioned stator element. In intermediate axial positions of the rotor elements, the rotors will revolve at intermediate speeds.

In addition to the novel provisions referred to for obtaining a variation in the motor speed by an axial adjustment of the rotor elements relative to the stator elements, I may, of course, provide for further speed adjustments by employing such known expedient for adjusting the speed of an induction motor, as multiple and alternately usable sets of windings on one or more of the rotor and stator elements, or variable speed regulating resistances in the motor circuits.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described some of the forms in which my invention may be embodied.

Of the drawings:

Fig. 1 is a somewhat diagrammatic elevation in section of a motor having two stators and two rotors;

Fig. 2 is a diagram of windings and connections employed in Fig. 1;

Fig. 3 is a diagram of a modified winding arrangement which may be employed with the motor of Fig. 1;

Fig. 4 is a view taken similarly to Fig. 1 illustrating a modification; and

Fig. 5 is a diagram representing windings and connections which may be employed with such a motor as is shown in Fig. 4.

The typical embodiment of my invention shown in Fig. 1 is a motor having two stator core ring elements B and $b$ spaced apart from one another and rigidly connected to the motor frame A. The motor shaft G carries two rotor core elements E and $e$, which are spaced apart from one another and may be simultaneously adjusted axially with respect to the stators. As shown the rotor cores E and $e$ are rigidly secured on a sleeve F which is splined on the motor shaft G, and may be axially adjusted on the latter by means of a collar or fork member I working in a groove $F^2$ formed in the spider member F and connected to a screw shaft J parallel to the motor shaft and working in a threaded aperture $A'$ formed in one of the end members of the motor frame. The shaft J is provided at its outer end with a hand wheel $J'$. By rotating the wheel $J'$ the sleeve F, and thereby the rotors, may be axially adjusted back and forth between the positions shown in full and in dotted lines in Fig. 1. As shown, the rotor elements E and $e$ are spaced apart by a collar $F'$, the axial length of which is such that when either of the rotor elements is centrally disposed with respect to the corresponding stator element, as the rotor element E is disposed with respect to the stator element B in the full line showing of Fig. 1, the other rotor element is in the space between the adjacent sides of the two stators.

The windings for the motor shown in Fig. 2 comprise two diametrically opposed field or primary windings $D'$ and $D^3$ for the stator B which are connected in series with one another between the supply conductors 1 and 3, and two intermediate windings $D^2$ and $D^4$ connected in series with one another between the supply conductor 2 and 4. It will be understood that the supply conductors 1 and 3, 2 and 4 supply alternating currents displaced 90° in phase from one another. The windings for the stator $b$ comprise four field windings $d'$, $d^3$, $d^5$ and $d^7$ spaced at equal intervals around the axis of the stator and connected in series with the windings $D'$ and $D^3$ between the supply conductors 1 and 3, and four windings $d^2$, $d^4$, $d^6$ and $d^8$ intermediate the windings $d'$, $d^3$, $d^5$, $d^7$ respectively, and connected in series with the stator windings $D^2$ and $D^4$ between the supply conductors 2 and 4. With this arrangement the stator B and $b$ are wound for two and four poles respectively and the magnetic field set up by the field windings of the stator B will revolve with twice the velocity of the magnetic field set up by the windings for the stator $b$.

The windings shown in Fig. 2 for the rotor E comprise three pairs of diametrically opposed windings $H'$ and $H^4$; $H^2$ and $H^5$; and $H^3$ and $H^6$; the adjacent windings being displaced from one another by an angle of 60°. The windings for the rotor $e$ comprises six pairs of diametrically opposed coils $h'$, $h^7$; $h^2$, $h^8$; $h^3$, $h^9$; $h^4$, $h^{10}$; $h^5$, $h^{11}$; $h^6$, $h^{12}$; each winding being angularly displaced 30° from its neighbors. The windings $H'$ and $H^4$ of the rotor E are connected in series with the windings $h'$, $h^7$, $h^4$, $h^{10}$ of the rotor $e$. Similarly the windings $H^2$ and $H^5$ are connected in series with the windings $h^2$, $h^8$, $h^5$, $h^{11}$ of the rotor $e$, and the windings $H^3$ and $H^6$ are connected in series with the windings $h^3$, $h^9$, $h^6$, $h^{12}$ of the rotor $e$. The windings on the rotors are thus three phase windings delta connected though they may be connected in Y, and the rotor $e$ is wound for twice as many poles as the rotor E.

In Fig. 3 I have illustrated, diagrammatically, a motor which differs from that shown in Figs. 1 and 2 in that the rotors EA and $ea$ each has its own squirrel cage winding.

With a supply current frequency which will cause a motor constructed and wound as shown in Figs. 1 and 2, to revolve with a speed of 3600 revolutions per minute when the rotor and stator elements are in the relative positions shown in full lines in Fig. 1, the rotors will tend to revolve at a speed of 1800 revolutions per minute when the rotors are adjusted axially into the dotted line position shown in Fig. 1. In intermediate axial positions of the rotors relative to the stators, the speed will be intermediate of the maximum and minimum speeds of 3600 and 1800 revolutions per minute.

It is hardly necessary to observe that with such a motor as is illustrated in Figs. 1 and 2 the actual value of the maximum and minimum definite speeds depend upon the frequency of the supply current and the number of poles for which the different motor elements are wound, and that by a suitable relative arrangement of windings, the minimum definite speed may be made more than or less than half the maximum definite speed.

With such an embodiment of my invention as is illustrated in Figs. 1 and 2, the motor has three synchronous speeds. One of these is the motor speed when the rotor E is wholly out of the influence of the stator B. Another is the speed when the rotor e is wholly out of the influence of the stator b. The third synchronous speed is the intermediate speed at which the flow through the windings of the rotor e of currents induced in the windings of the rotor E, sets up a magnetic field which revolves in space at the same speed as does the field set up by the windings of the stator element b. For example, if the field set up by the windings of the two pole stator B revolves with a speed of 2000 revolutions per minute, and the field set up by the four pole windings of the stator b revolves with a speed of 1000 revolutions per minute, the intermediate synchronous motor speeds will be 1333⅓ revolutions per minute.

The motor shown in Fig. 4 differs structurally from that shown in Fig. 1 in that its rotor comprises two additional unwound core elements EB and eb so spaced away from the rotor cores E and e, respectively, that with the rotor E in its position of maximum magnetic interaction with the stator B, the rotor core element eb lies directly within the field of the stator b, and when the rotor e lies directly within the field of the stator element b, the core element EB lies directly within the field of the stator B. The windings for the rotor element E and e may be identical with those shown in Fig. 2 and this is true also of the two stator windings except that, as shown in Fig. 5, the windings for the two stator elements are preferably connected in parallel to the supply circuits since the core elements eb and EB act inductively to prevent an undue current flow through the inactive stator windings. The series connection of the windings for the two stators shown in Figs. 1 and 2 prevents an injurious rush of current through the windings of the stator B or stator b due to their magnetic short circuiting, so to speak, when the rotors are moved into the positions for minimum or maximum speeds respectively.

While in accordance with the provisions of the statutes I have illustrated and described the best forms of my invention now known to me, I contemplate the possibility of variations from the forms disclosed or suggested herein without departing from the spirit of my invention as set forth in the appended claims, and those skilled in the art will understand that certain features of my invention may sometimes be used with advantage without the corresponding use of other features.

Having now described my invention, what I claim as new and desire to secure by Letters Patent, is:

1. An adjustable speed induction motor comprising coaxial primary and secondary members, provisions for setting up in the primary member two axially displaced magnetic fields rotating around the motor axis at different speeds, and provisions for adjusting the primary and secondary members axially with respect to one another to thereby vary the relative inductive effects of the two rotating fields on the secondary member of the motor.

2. In an induction motor, the combination with a primary member inducing two axially displaced magnetic fields revolving with different angular velocities about the motor axis, of a secondary member comprising two interconnected, axially adjustable, polyphase windings, and means for axially adjusting the primary and secondary members relative to each other to thereby vary the relative inductive effects of the two rotating fields on the secondary member of the motor.

3. In an induction motor, the combination with a primary member inducing two axially displaced revolving magnetic fields, which revolve at different angular speeds, of a secondary member comprising core and winding parts so axially disposed that by an axial adjustment of the primary and secondary members relative to one another the inductive relation between one of said fields and said secondary member may be made better or worse depending upon the direction of the adjustment, while at the same time the inductive relation between the other field and the secondary member is made worse or better, and means for so axially adjusting the primary and secondary members relative to one another.

Signed at Garwood in the county of Union and State of New Jersey this twenty-fourth day of January A. D. 1921.

EDWARD G. PARVIN.